United States Patent [19]
Digby

[11] 3,771,139
[45] Nov. 6, 1973

[54] ASSOCIATIVE MEMORY METHOD OF PERFORMING SIMULTANEOUS CONTENT-SEARCHES

[76] Inventor: David W. Digby, 311 S. Brown Ave., Orlando, Fla.

[22] Filed: May 3, 1971

[21] Appl. No.: 139,421

[52] U.S. Cl. .......... 340/172.5
[51] Int. Cl. .......... G11c 15/00
[58] Field of Search .......... 340/172.5; 444/1

[56] References Cited

UNITED STATES PATENTS

| | | | |
|---|---|---|---|
| 3,320,594 | 5/1967 | Davies | 340/172.5 |
| 3,350,698 | 10/1967 | Pritchard, Jr. | 340/172.5 |
| 3,320,592 | 5/1967 | Rogers et al. | 340/172.5 |
| 3,328,767 | 6/1967 | Ottaway | 340/172.5 |
| 3,611,315 | 10/1971 | Murano et al. | 340/172.5 |
| 3,354,436 | 11/1967 | Winder | 340/172.5 |
| 3,332,069 | 7/1967 | Joseph et al. | 340/172.5 |

OTHER PUBLICATIONS

"Bulk Processing in Distributed Logic Memory" by B. A. Crane and J. A. Githens, IEEE Transactions on Electronic Computers, Vol. EC–14, Issue 2, April 1965, Pages 186–196.

*Primary Examiner*—Gareth D. Shaw
*Attorney*—J. G. Pere and L. A. Germain

[57] ABSTRACT

Disclosed is a method for performing a "many-to-many" content-addressed search between two extensive bodies of data. The searches are performed in bit-serial word-parallel fashion. A tag-bit is associated with each word for each comparison. The value of the tag-bit is determined by a function selected in accordance with the comparison to be performed and whose value is determined by the value of the bits of the word and comparand.

6 Claims, 3 Drawing Figures

INVENTOR
DAVID W. DIGBY
BY
Oldham & Oldham
ATTORNEYS

INVENTOR
DAVID W. DIGBY
BY
Oldham & Oldham
ATTORNEYS

ASSOCIATIVE MEMORY METHOD OF PERFORMING SIMULTANEOUS CONTENT-SEARCHES

A conventional (bit-serial) associative memory (CAM) is a digital storage device in which the contents of all stored data items may be simultaneously compared with a single search argument or "Comparand." The several bits of the data field are examined one-by-one; but for each such bit position, all stored data items are examined in parallel.

The Multiple Comparand Associative Memory (MCAM), described herein is an extension of this CAM concept that allows more than one comparand to be used at the same time. The comparison process is broken up into several steps for each bit-position examined, which takes more time than a single comparand search would require. However, this additional time is a constant for each particular type of search regardless of the number of comparands involved. If $c$ Comparands are to be used to search a data field containing $b$ bits, then the time required by a CAM would be proportional to $c*b$. The corresponding time required by an MCAM is $n*b$, where $n$ is a constant determined by the complexity of the search performed and the hardware implementation employed. (For a simple logical search, $n$ might be as small as 2 to 4. A reasonable value of $n$ for many useful searches might be 10.) The MCAM is faster than the CAM whenever the number of comparands (c) is greater than $n$. The value of $n$ is smallest when a single simple search is imposed upon all comparands. If a more complex search is used, or if a mixture of several different searches is performed simultaneously, $n$ is necessarily larger.

Depending upon the hardware implementation, the comparand and data items may be stored in completely separate storage arrays, or in segregated portions of a common array. For greater generality, this discussion will assume a common array. Each data item must be provided with a set of tag-bits, one corresponding to each comparand. The match/no-match result of each search comparison will be contained in these tag-bits at the conclusion of the search. (This discussion will assume that each comparand item is also provided with an identical set of such tag-bits, although some of the operations to be described can be effected without them.)

The operational speed will be influenced considerably by the hardware capabilities for writing into these tag-bits. They must be written into repeatedly, and selected sets of tags must be written, in parallel, into selected sets of words simultaneously. Furthermore, this "Parallel Multi-write," as it is called, must variously take the form of an "AND to memory" or an "OR to memory" operation. In general, these requirements can be met by "coincident current" schemes if they provide for driving more than one column and more than one row in parallel.

It is an object of the invention to provide a method for performing content-addressed searches between two extensive bodies of data.

It is also an object of the present invention to provide such a search method which is independent of the number of items in either body of data and proportional only to the number of bits per data item.

For a better understanding of the invention reference should be had to the accompanying drawings wherein.

SEARCH OPERATIONS

A. THEORY — Since all searches are preformed bit-sequentially, each individual comparison (of one comparand vs. one data item, at one bit-position in the sequence) is simply a comparison between two bits. Since each bit can have only two possible values, there are only four cases which can arise, as follows:

1. 00 — Both Comparand and data bits are ZERO
2. 01 — Comparand bit is ZERO, data bit is ONE
3. 10 — Comparand bit is ONE, data bit is ZERO
4. 11 — Both comparand and data bits are ONE If all comparand/data pairs are examined, each one must fall into one of the preceding cases. Essentially, the tag-bits corresponding to their pairs have been "partitioned" into four categories. If each such category of tag-bits could be somehow selected, while a logical operation, appropriate to the corresponding comparison case, was performed upon all these selected tags simultaneously, then an entire search would be accomplished in four steps per bit-position.

In any actual search, however, at least one of the four cases must specify the "null" logical operation; i.e., "do nothing at all." For this case, of course, it is not even necessary to select the corresponding tag-bits. Most if not all searches will treat two or even three cases in this way. It is clear then, that all four cases need actually be processed only when a mixture of different searches is performed together, which *collectively* require all four active cases.

B. GENERAL ALGORITHM — All search algorithms capable of implementation by this technique can be generalized as follows, (specific aspects of each search are given in Tables I and II):

1. Each individual comparison takes place between one comparand bit and one data bit, both fields containing the same number of bits.

2. A Mask field, of the same length as the data fields, may or may not be associated with the comparand or the data item or both. The mask, when provided, is used to determine, for each bit-position, whether a comparison is to take place. A zero mask bit, in either comparand or data mask, causes the single corresponding bit-comparison to be ignored for that pair of items.

Figure 1:
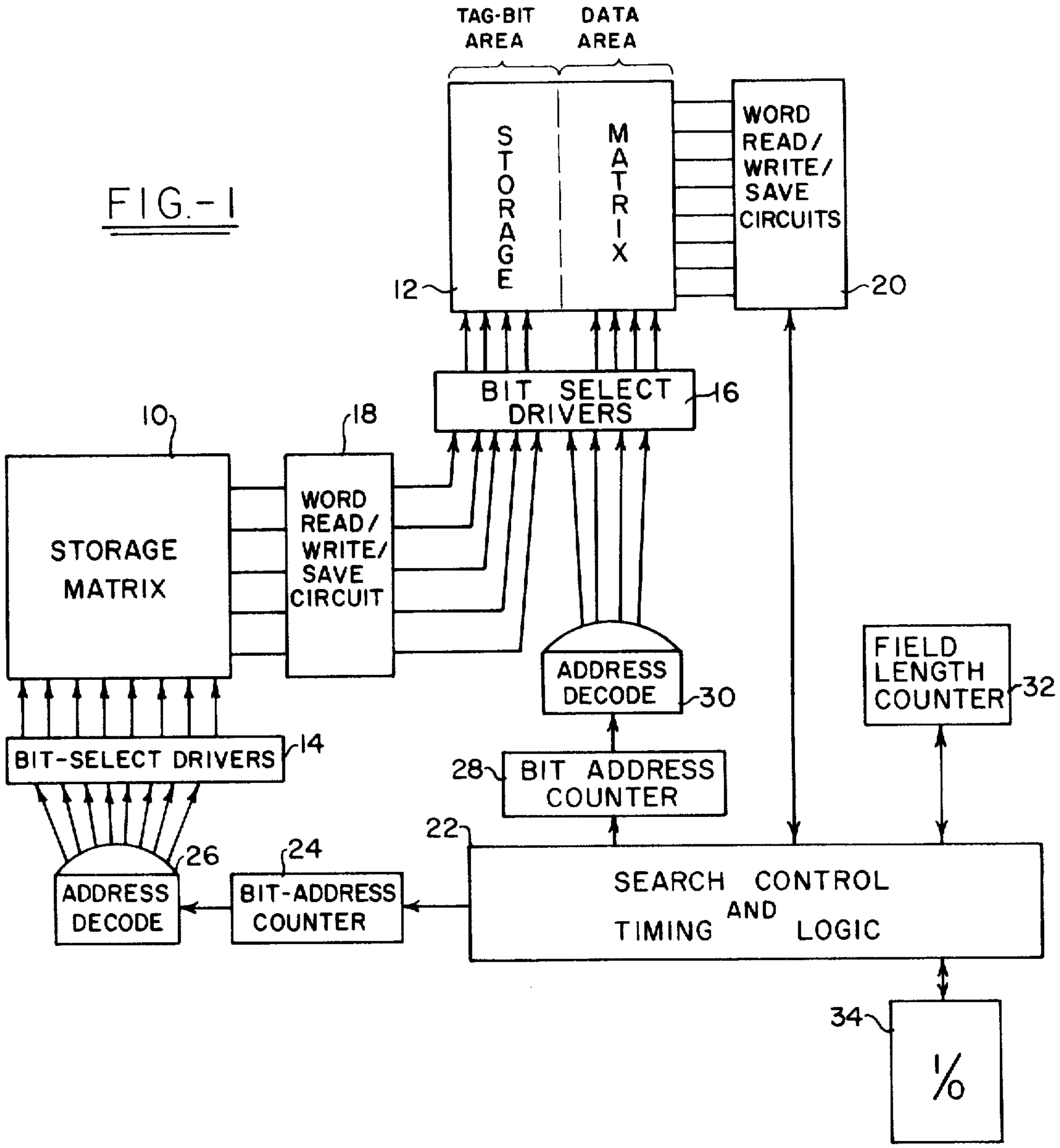
FIG. 1 is a block diagram of a first embodiment of an associative processor capable of performing the search procedures of the present invention.
Figure 2:
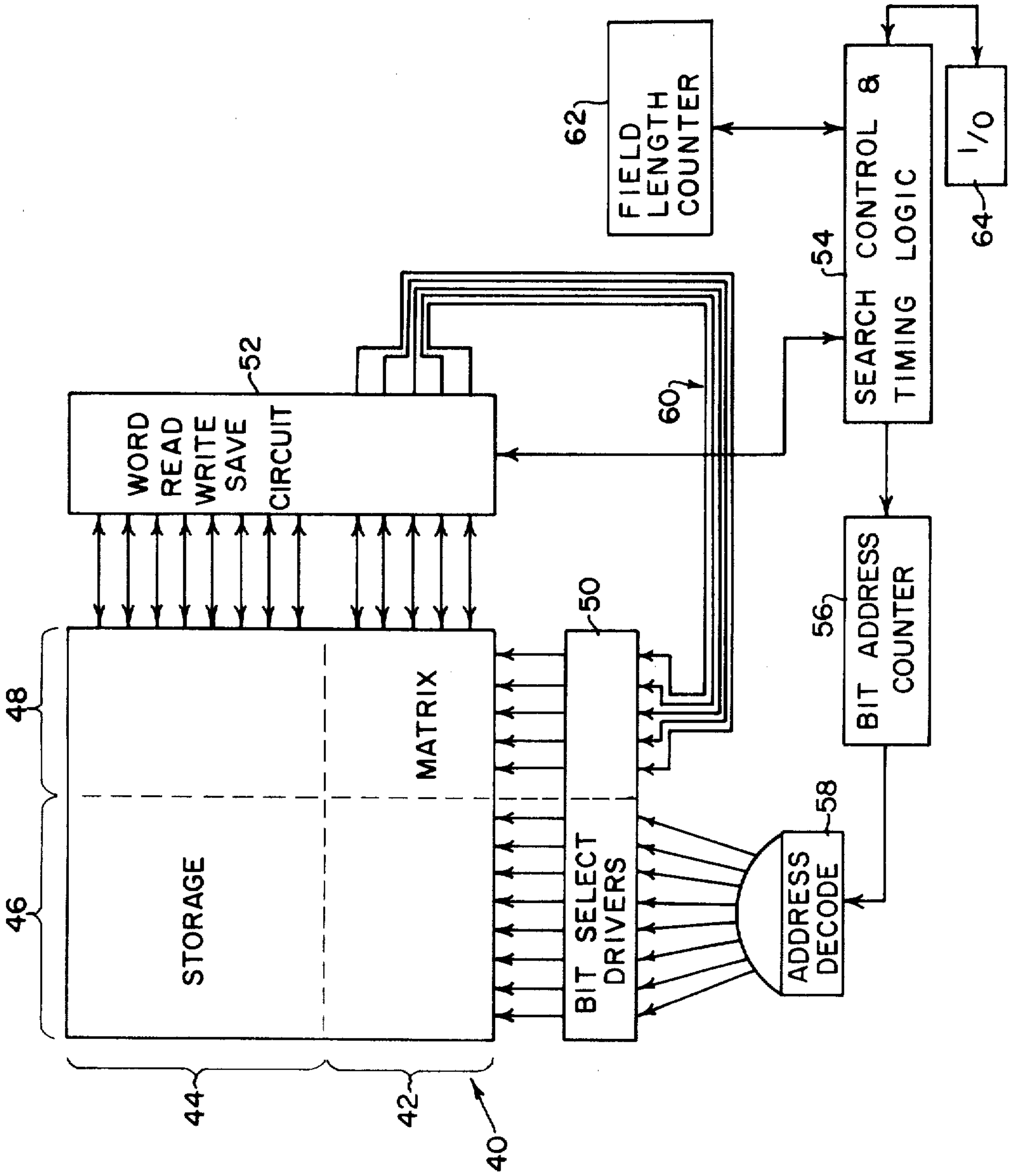
FIG. 2 is a block diagram of a second embodiment of an associative processor capable of performing the search processes of the present invention.

3. An individual tag-bit is associated with each comparison. All tags associated with a given word are considered as being *in* a part of that word, and all tags associated with a particular comparand are in a specific corresponding bit-position of *each* word (FIGS. 1 and 2 show this storage arrangement. In other words, each word of the data field will have associated with it a unique tag bit for each of the words in the comparand field. As will be discussed more thoroughly hereinafter, it is these unique tag bits which provide the means for receiving and storing information corresponding to the relationship between the data word and the comparand word in light of the particular comparison being formed.

4. When a mixture of search operations is permitted, a Code field must be associated with each Comparand. The code contained in this field specifies what operation is used with each corresponding comparand item.

5. Prior to making any comparisons, the values of the tag-bits may or may not be initialized, either to ONE or ZERO. (For any tag not initialized, the results of some previous search, as represented by the old contents of the tag, will have an effect on the results of the search now under way).

6. During the ensuing search, the corresponding bit-positions of all data items, comparand items (and mask-fields, if used), are matched up, least significant to least significant first, and proceeding in sequence to the most significant vs. most significant. All succeeding steps apply separately to each of these bit-positions; the value remaining in the tag-bits, after the last bit-position has been processed, will constitute the results of the overall search.

7. The current bit-position of all data and comparand items is examined. In most practical implementations, this would involve reading the value of this bit-position into an active storage device asscoiated with each memory word.

8. Of the four comparand/data pair values, any that require no action to be taken are henceforth ignored. (Note, however, in case a mixture of operations is in process, if *any one* of the operations requires action for a particular case, then that case must be processed, not ignored, even if some other operations make no use of it). The rest are processed (one-by-one) as follows:

a. For each case $(x, y)$ requiring processing, "Select" all data words for which the current data bit $= y$, and for which the current mask bit $= 1$ (if used).

b. At the same time, "Select" all comparand words for which the current bit $= x$, and for which the current mask bit $= 1$ (if used).

c. If $f(x, y)$ is the logical value (ONE or ZERO) called for by the case $(x, y)$, [for $(x, y) = (0, 0)$, $(0, 1)$, $(1, 0)$ or $(1, 1)$], then force all selected tag-bits to assume the value $f(x, y)$. A tag-bit is "Selected" only if *both* the word and bit-position it occupies are selected as in steps (a) and (b). All unselected tag-bits remain unaltered by this case.

9. After all required cases have been processed for one data bit-position, the same set of cases are repeated for the next, more significant bit-position.

10. After all bit-positions in the data field have been so processed, the value remaining in each tag-bit is the final result of the comparison performed upon the data/comparand pair corresponding to that tag-bit.

11. The sum total of these tag-bit values is the final result of the multiple comparand search.

C. SPECIFIC OPERATIONS — Each specific search operation is defined by a distinct combination of five logic functions, one for each of the four cases (00), (01), (10), and (11), plus one for the initialization step prior to the first comparison. Each of these logic functions can take one of three values, namely:

1. "ZERO," (2) "ONE" or (3) "NULL". "ONE and ZERO" are the standard logical values — equivalent to the values "TRUE" and "FALSE," respectively. "NULL" has the meaning "do nothing at all," which has the logical effect that each affected tag-bit retains its own previous value. (A fourth possible function value, "COMPLEMENT," could be used for more complex searches, as yet unspecified.)

Three values for each of five functions give a total of $3^5 = 243$ possible combinations. Many of these do not represent useful search operations, however, since:

1. Not all of the four case functions may be "NULL," or else no actual comparisons will take place.

2. Some case-function (at least one) MUST be "NULL" if the search is to include fields longer than one bit.

3. If the initialize-function is ONE or ZERO, then at least one of the four case-functions *must* have the opposite value (ZERO or ONE, respectively).

These three requirements eliminate 79 of the 243 possible combinations, leaving 164 potentially useful searches. These can be separated into two categories:

1. The first category contains 108 searches which include *both* ONE and ZERO among the four case-function; thus are sensitive to the exact order in which the bit-positions are examined. Since this is a characteristic of all arithmetic operations, these possible searches will be termed "Arithmetic," even though many of them may turn out to have little relationship to any well known arithmetic function.

2. The remaining 56 have only ONE's or ZERO's among the four case-functions, but *not both*. The search results are completely unaffected by the ordering of the bits. All of these possible searches will be termed "Logical," even though some of them may possess arithmetic significance as well. Of these, 32 can be described as single comparand searches of one form or another, so that only 24 remain as actual multiple comparand searches.

All 24 represent useful logical searches and are listed in Table I. In the table, ZERO is represented as 0, ONE is represented as 1, and "NULL" is represented as N. Each table entry represents two distinct searches, as specified in the footnote.

TABLE I — LOGICAL SEARCHES

| LOGIC FUNCTIONS FOR Comparand/Data Case: | | | | Initial Value * | |
|---|---|---|---|---|---|
| 00 | 01 | 10 | 11 | | Description of Search |
| N | N | N | 1 | 0 | Set Intersection (i.e.; both have a ONE in some bit-position) |
| N | N | N | 0 | 1 | Disjoint Sets (i.e.; non-intersection, no common ONE bits) |
| N | N | 0 | N | 1 | Comparand in Subset of Data (i.e.; all comparand ONE's match data ONE) |
| N | N | 1 | N | 0 | Comparand NOT Subset of Data (i.e.; some comp. ONE matches data ZERO) |
| N | 0 | N | N | 1 | Data is Subset of Comparand (i.e.; all data ONE's match comp. ONE) |
| 1 | N | N | N | 0 | Complements Intersect (i.e.; both have a ZERO in some bit-position) |
| 0 | N | N | N | 1 | Disjoint Complements (i.e.; no common ZERO bits) |
| N | 0 | 0 | N | 1 | Exact Match, or Equal (i.e.; every bit equal) |
| N | 1 | 1 | N | 0 | Mismatch, or Not Equal (i.e.; some bit not equal) |
| 1 | N | N | 1 | 0 | Some bit Equal |
| 0 | N | N | 0 | 1 | Exact Complement (i.e.; every bit unequal) |

* Note: All of the above searches may be modified by changing the initial value function to N (NULL). This allows the previous search results to influence the outcome of present search in the following manner: If N replaces a 0, then the two searches are OR'ed. If N replaces a 1, then the two searches are AND'ed.

Table II presents a small sampling of the 108 possible "Arithmetic" searches. Most of those not shown cannot be simply described in arithmetic terms.

TABLE II — ARITHMETIC SEARCHES

LOGIC FUNCTIONS FOR Comparand/Data Case:

| 00 | 01 | 10 | 11 | Initial | Description of Searches |
|---|---|---|---|---|---|
| N | 0 | 1 | N | 0 | Data Less Than Comparand |
| N | 0 | 1 | N | 1 | Data Less Than or Equal to Comparand |
| N | 1 | 0 | N | 0 | Data Greater Than Comparand |
| N | 1 | 0 | N | 1 | Data Greater Than or Equal to Comparand |
| 0 | N | N | 1 | 0 | Overflow Check (if two fields were added) |
| 1 | N | N | 0 | 1 | Check No. Overflow (if two fields were added) |
| N | 0 | 0 | 1 | 1 | Most Significant ONE bits Equal (all ZERO's respond also) |
| N | 0 | 0 | 1 | 0 | Most Significant ONE bits Equal (all ZERO's does not respond) |
| 1 | 0 | 0 | N | 0 | Most Significant ZERO bits Equal (all ONE's does not respond) |
| 1 | 0 | 0 | N | 1 | Most Significant ZERO bits Equal (all ONE's respond also) |

(Note that Initialized Function may also be changed to N, but in this case the previous search results can only effect a minor variation in the operation of the present search.)

LOGICAL ORGANIZATION

The organization of a Multiple Comparand Associative Memory (FIG. 1) depicts separate storage arrays for comparands and the rest of the data. This arrangement allows complete independence of control functions applied to the two sets of word circuits; but, it is somewhat inflexible in regard to the number of comparands used (an unused comparand word cannot be used as data, for example).

The data could also be stored in a separate memory which is connected to the same Word Read/Write/Save Circuits as the Tag-bits. The data in this separate memory would be read out to the Word Read/Write/Save Circuits in a word parallel, bit serial manner. The use of a separate data memory would reduce equipment costs in cases where the amount of data is fairly extensive. This arrangement is not shown in FIG. 1 but its application should be apparent to one skilled in the art.

FIG. 2 illustrates an alternate organization, in which all data, comparand or otherwise, occupies a larger common storage array. The comparand words are provided with special outputs, each being connected to one of the Bit-Select Drivers in the Tag-Bit field. However, in the simplest machine, all of the word circuits, comparand or otherwise, are controlled by the same set of search control and timing logic; bit selection likewise applies equally to both. Thus, an unused comparand word may be used as a non-comparand for more efficient storage assignment.

For some of the most useful searches (Exact Match, for instance), the comparand words need not be distinguished from the others, even by stored flag bits. Hence, each comparand can participate in both capacities, making the set of comparands a proper subset of the set of data words. In this case the comparands are all mutually compared with each other, as well as with the larger set of non-comparands. Some of the more complex searches, however, while not permitting this "reflexive" search, may also incur a larger time penalty in treating the two parts of memory differently; unless some segregated control gates are provided, similar to those required by the completely separate arrangement).

In operation, each data/comparand comparison case is treated as follows:

1. A selected bit of each word is read out into the word circuit of all comparands and non-comparands.

2. All word circuits containing the *data* value appropriate to this case are selected to Write.

3. Each comparand word circuit, containing the *comparand* value appropriate to this case, is selected to drive the special output—which in turn activates the corresponding Bit-Select Driver in the Tag-Bit Field.

4. The value of the Logic Function*, required by this case, is Written into each and every Tag-Bit which has been selected from *both* directions; i.e., a tag is written if and only if it belongs to a word selected in step (2) *and* it is in a bit-position selected in Step (3).

In order to illustrate further the operation, the following description is presented for the case where the tag-bits are provided by a plated-wire associative processor such as that described in a patent application entitled "Associative Processor", filed Dec. 29, 1969 and given Ser. No. 1495, and assigned as the instant application. It will be obvious that other implementations could be employed.

Figure 3:
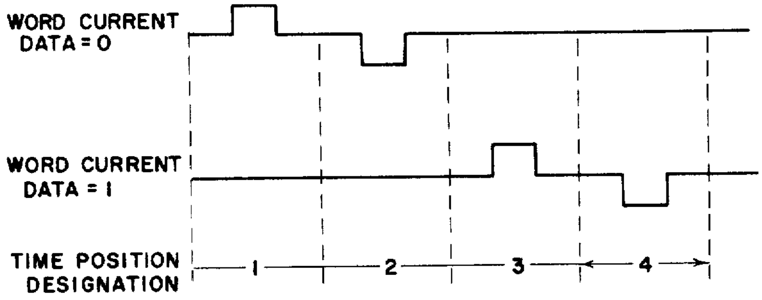
FIG. 3 is a graph illustrating the definition of the Pulse Time Positions.

The desired operation is provided by the proper coincidence of pulses on the word and bit lines. Four pulse times must be provided for the word lines. Individual bit pulses will occur during only one or two of the word pulse times. Data is written into the plated-wire memory element only upon simultaneous occurence of a word and bit pulse. The time positions of the four word pulse times are defined in FIG. 3. The convention adopted in FIG. 3 is that a positive word current will write a logical one if a bit current is also present, and a negative word current will likewise write a logical zero. The desired operation of the Multiple Comparand associative memory is then obtained by providing bit pulses at the proper word current time in accordance with the values of the comparand and data bits and the type of search being performed. This operation is illustrated in Table III for several of the searches listed in Table I and Table II. The extension to other type searches should be readily apparent to those skilled in the art.

TABLE III — TIME RELATION OF BIT AND WORD PULSE

| Time Position For Bit Pulse Comparand =0 | Comparand =1 | Initial Value | Description of Search |
|---|---|---|---|
| 4 | 2 | 1 & 3 | Exact Match |
| None | 3 | 2 & 4 | Set Intersection |
| 3 | 1 | 2 & 4 | Mismatch |
| 4 | 1 | 2 & 4 | Data Less than Comparand |
| 4 | 1 | 1 & 3 | Data Less than or Equal to Comparand |

| | | | |
|---|---|---|---|
| 3 | 2 | 2 & 4 | Data Greater than Comparand |
| 3 | 2 | 1 & 3 | Data Greater than or Equal to Comparand |

FIG. 1 shows a block diagram of one embodiment of an associative processor capable of performing the search procedures of the present invention. The processor in this embodiment includes two storage matrixes 10 and 12 for storing the comparand and data fields respectively. Each matrix is a digital memory device capable of storing words as a series of bits. The matrixes may for example, be pleated wire memory devices. The data storage matrix 12 includes a tag bit area for storing the tag bits associated with each word stored in the matrix. Associated with each of the matrixes 10 and 12 are bit-select drivers 14 and 16, respectively, and word read/write/save circuits 18 and 20, respectively. The operation of the associative processor is controlled by the search control and timing logic 22 which controls the word read/write/save circuits 18 and 20, and through the bit address counters 24 and 28 and the address decoders 26 and 30, some of the bit select drivers 14 and 16. The search control and timing logic 22 includes the micro programs which control the bit-select drivers 14 and 16 and the word read/write/save circuits 18 and 20 to select the comparand word bits and data word bits and to perform the comparing and tagging operations in accordance with the algorithm discussed above. The associative processor also includes the field length counter 32 and input/output devices 34.

The embodiment of the associative processor illustrated in FIG. 2 differs from that illustrated in FIG. 1 in that a single storage matrix 40 is provided for both the comparand and data fields 42 and 44, respectively. The storage matrix 40 is further divided into a word storage area 46 for both the data and comparand areas and to a tag bit area 48 for storing the tag bits associated with each word in the memory. Associated with the storage matrix 40 is the bit-select driver circuit 50 and the word read/write/save circuits 52 which are controlled by the search control and timing logic 54, the bit select drivers 50 being controlled through the bit address counter 56 and the address decoder 58. The word read/write/save circuits 52 provide an input from the comparand area 42 of the storage matrix 40 to some of the bit-select drivers 50, as indicated at 60. The associative processor again includes a field length counter 62 and input/output devices 64.

In light of the description of the apparatus and operation of the instant invention presented hereinabove, a specific example of a multiple comparand data search will now be illustrated to better clarify and illustrate the teachings of the invention. Particular reference should now be made to FIG. 2 wherein it can be seen that words of a data field are stored in the memory array in the area designated by the numerals 44 and 46. Further, the comparands to be utilized in the various operations of the invention are stored in the memory array 40 in the area designated by the numerals 42 and 46. The area designated by the numerals 44 and 48 in the memory 40 contain tag bits such that there is associated with each data word in the memory 40 a tag bit for each comparand word therein. There may be, of course, tag bits associated with the comparand words, such tag bits being stored in the area designated by the numerals 42 and 48.

It should be particularly noted that the tag bits 44, 48 are directly related to and associated with the comparand words 42, 46 as well as the data words 44, 46. As can be understood from the system of FIG. 2 the array 40 is of such a type as to require the coincidence of a word current and a bit current at a bit thereof in order to affect the state of that bit. Therefore, in order to affect the states of the tag bits so as to be indicative of the correlation between the associated data word and comparand word in light of the particular operation being performed the tag bits must be influenced by both a word current and a bit current. It should be recalled from the discussion hereinabove that in any comparison operation three parameters must be considered; the value of the bit of the data field, the value of the bit of the comparand field, and the particular comparison or operation to be performed. Therefore, if the word currents used to effect the tag bits associated with the data words are controlled by the states of the data bits in interest and if the bit currents used to affect the corresponding tag bits are controlled by the values of the comparand bits and the operations to be performed then it can be seen that the coincidence of the various word currents and bit currents at the individual tag bits will affect the tag bits so as to indicate the relationship between the corresponding data words and comparand words in light of the operation being performed. It should therefore be particularly noted that the instant invention is uniquely applicable to data storage arrays utilizing coincident current techniques.

With reference to the apparatus of FIG. 2, the array current relationships of FIG. 3, and the relationships illustrated in Tables I and III, the basic operation of the apparatus of the instant invention will now be discussed in relation to a particular search, Exact Match. In order to compare all words of the data field with all words of the comparand field to determine wherein lie exact matches, the instant invention teaches that the least significant bit of all words be read into Circuit 52. The tag bits, as indicated in Table I, must then be set to the initial value of a logic 1. As indicated in Table III and FIG. 3 the initialization may readily be achieved by the circuit 52 by controlling the bit select drivers 50 through means of the feedback lines 60 so as to gate bit current to the tag bits at times 1 and 3; the tags associated with data words having a bit value of 0 being set at time 1 and those having a bit value of 1 being set at time 3 by the coincidence of the word current and the bit current at those times. Since all word bits must either have the value of 0 or 1 it is apparent that all of the tag bits have now been set to a logic 1. With the tag bits set it is to be understood that at the end of the total operation those tag bits remaining set will indicate an exact match between the corresponding data word and comparand word. It is therefore the purpose of the operation to reset those tag bits where mismatches occur as can be seen in Table I; that is, where the comparand bit is 0 and the data bit is 1 or where the comparand bit is 1 and the data bit is 0. This is accomplished by providing for the coincidence of bit current and word current at time 2 if the comparand equals 1 and at time 4 if the comparand equals 0 since at time 2 there is a resetting word current available to those tag bits associated with data bits in the 0 state and at time 4 there is a resetting word current available to those tag bits associated with data bits being in the 1 state. At the end of time 4 then it can be seen that a total comparison has been made between the least significant bit of all the comparands and the least significant bits of all the data words. Therefore, the next most significant bit of all the words must then be read into the circuit 52 and the same operation be performed as for the first bit except, of course, the tag bits need not be initialized in this step. After all bits of the words have been so operated upon those tag bits retaining a logic 1 value will indicate that the data word and comparand word associated therewith are exactly the same and satisfy the conditions of the Exact Match.

It should, of course, be understood that although in the above example the same operation was performed between all data words and comparands, such need not be the case. Each data word may be compared differently to each of the comparand words consistant with the teachings of the invention since the bit currents associated with the tag bits may be controlled individually in accordance with the search or operation to be performed.

While in accordance with the Patent Statutes, only the best known embodiment of the invention has been illustrated and described in detail, it will be understood that the invention is not limited thereto or thereby. Reference should be had to the appended claims in determining the true scope of the invention.

What is claimed is:

1. The method of performing simultaneous content searches between a data field and a compared field in a digital computer system characterized by a memory array requiring the coincidence of a word and a bit current for writing thereinto and further characterized by a word read/write/save circuit whereby the characteristics of the word and bit currents may be controlled, comprising the steps of:

a. storing the data field in the memory array as bit aligned words;
b. storing the comparand field in the memory array as bit aligned words;
c. associating with each word of the data field at least one tag bit in the memory array for each word of the comparand field;
d. simultaneously reading the identical bit of selected words of the data field into the word read/write/save circuit and allowing those bits to control the characteristics of the word currents, one word current being associated with each word of the data field;
e. simultaneously reading the identical bit of selected words of the comparand field in the word read/write/save circuit and allowing those bits, in accordance with the particular content search designated, to control the characteristics of the bit currents, one bit current associated with each word of the comparand field;
f. setting the tag bits associated with each word of the data field to a state indicative of the relationship between the data field word bit and the corresponding comparand field word bit by means of the coincidence at the tag bit of the word current and the bit current associated with the data field word and the comparand field word respectively; and
g. repeating steps d through f for all bits of the words of the data field and the corresponding bits of the words of the comparand field such that when all such bits have been operated on the state of each of the tag bits will be indicative of the relationsip, in light of the particular content search performed, between the associated data field word and comparand field word.

2. The method according to claim 1 which includes the utilization of a mask field whereby content searches are performed only be-tween specified bits of the words of the data field and those of the comparand field.

3. The method according to claim 1 including the step of assign-ing a value to each tag bit prior to the performance of any content searches so that the resultant value of each tag bit at the completion of the simultaneous content searches is unaffected by prior searches.

4. The method according to claim 1 in which the comparand field forms a subset of the data field.

5. Apparatus for performing simultaneous content searches between a data field and a comparand field comprising:

a digital memory which may be written into by means of the coincidence of word currents and bit currents, the memory being divided into at least three sections, a first section for storing a plurality of data words as bit aligned words, a second section for storing a plurality of comparand words as bit aligned words, the data and comparand words being bit aligned, and a third section having groups of tag bits therein, one such group associated with each of the plurality of data words and each group containing one tag bit for each of the plurality of comparand words; and circuit means connected to the memory for simultaneously reading an identical bit of all data and comparand words and controlling word currents to the groups of tag bits associated with the data words in accordance with the values of the bits of the respective data words and further controlling bit currents to each of the tag bits in accordance with the values of the bits of the respective comparand words and the particular content search being performed.

6. The apparatus according to claim 5 which further includes output circuit means operative to furnish as output data each word having predetermined tag bit values at the completion of the content searches.

* * * * *